US011340901B2

United States Patent
Piry et al.

(10) Patent No.: US 11,340,901 B2
(45) Date of Patent: May 24, 2022

(54) APPARATUS AND METHOD FOR CONTROLLING ALLOCATION OF INSTRUCTIONS INTO AN INSTRUCTION CACHE STORAGE

(71) Applicant: Arm Limited, Cambridge (GB)

(72) Inventors: Frederic Claude Marie Piry, Cagnes sur Mer (FR); Peter Richard Greenhalgh, Cambridge (GB); Ian Michael Caulfield, Cambridge (GB); Albin Pierrick Tonnerre, Nice (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/982,300

(22) PCT Filed: Mar. 20, 2019

(86) PCT No.: PCT/GB2019/050778
§ 371 (c)(1),
(2) Date: Sep. 18, 2020

(87) PCT Pub. No.: WO2019/197797
PCT Pub. Date: Oct. 17, 2019

(65) Prior Publication Data
US 2021/0026635 A1    Jan. 28, 2021

(30) Foreign Application Priority Data
Apr. 10, 2018  (GB) ..................... 1805922

(51) Int. Cl.
*G06F 9/30*          (2018.01)
*G06F 12/0862*       (2016.01)
(Continued)

(52) U.S. Cl.
CPC ........ *G06F 9/30047* (2013.01); *G06F 9/3005* (2013.01); *G06F 9/30076* (2013.01);
(Continued)

(58) Field of Classification Search
CPC .............. G06F 9/30047; G06F 9/3005; G06F 9/30076; G06F 12/0862; G06F 12/0875; G06F 21/54; G06F 21/566; G06F 21/71
(Continued)

(56) References Cited

U.S. PATENT DOCUMENTS 6,658,554 B1 * 12/2003 Moshovos ............ G06F 9/3824
                                                711/147
2002/0069375 A1 * 6/2002 Bowen ..................... G06F 5/06
                                                713/400
(Continued)

OTHER PUBLICATIONS

International Search Report and Written Opinion for PCT/GB2019/050778, dated May 24, 2019, 15 pages.
(Continued)

*Primary Examiner* — Chun Kuan Lee
(74) *Attorney, Agent, or Firm* — Nixon & Vanderhye P.C.

(57) ABSTRACT

An apparatus and method are provided for controlling allocation of instructions into an instruction cache storage. The apparatus comprises processing circuitry to execute instructions, fetch circuitry to fetch instructions from memory for execution by the processing circuitry, and an instruction cache storage to store instructions fetched from the memory by the fetch circuitry. Cache control circuitry is responsive to the fetch circuitry fetching a target instruction from a memory address determined as a target address of an instruction flow changing instruction, at least when the memory address is within a specific address range, to prevent allocation of the fetched target instruction into the instruction cache storage unless the fetched target instruction is at least one specific type of instruction. It has been found that such an approach can inhibit the performance of speculation-based caching timing side-channel attacks.

13 Claims, 4 Drawing Sheets

(51) Int. Cl.
*G06F 12/0875* (2016.01)
*G06F 21/54* (2013.01)
*G06F 21/56* (2013.01)
*G06F 21/71* (2013.01)

(52) U.S. Cl.
CPC ...... *G06F 12/0862* (2013.01); *G06F 12/0875* (2013.01); *G06F 21/54* (2013.01); *G06F 21/566* (2013.01); *G06F 21/71* (2013.01); *G06F 2212/1052* (2013.01); *G06F 2221/034* (2013.01)

(58) Field of Classification Search
USPC .......................................................... 712/205
See application file for complete search history.

(56) References Cited

U.S. PATENT DOCUMENTS

| | | | |
|---|---|---|---|
| 2003/0140244 A1* | 7/2003 | Dahan ..................... | G06F 21/51 713/190 |
| 2008/0052799 A1 | 3/2008 | Yoo | |
| 2012/0151185 A1* | 6/2012 | Bybell .................. | G06F 9/3802 712/205 |
| 2019/0205136 A1* | 7/2019 | Hu ...................... | G06F 9/30079 |

OTHER PUBLICATIONS

Combined Search and Examination Report for GB1805922.0, dated Nov. 5, 2018, 5 pages.
Klein, "Meltdown and Spectre explained",—mattklein123—Medium, Jan. 23, 2018, pp. 1-20.
Anwar et al., "Cross-VM cache-based side channel attacks and proposed prevention mechanisms: a survey", Journal of Network and Computer Applications; 93; Sep. 6, 2017, pp. 259-279.
Guanciale et al., "Cache Storage Channels: Alias-Driven Attacks and Verified Countermeasures", IEEE Symposium on Security and Privacy, May 22, 2016, pp. 38-55.
Aciiçmez et al., "New Results on Instruction Cache Attacks", MICCAI 2015, 18th international conference proceedings, Aug. 17-20, 2010, pp. 110-124.
"Cache Speculation Side-channels", Arm Whitepaper, Feb. 2018, version 1-2., pp. 1-13.

* cited by examiner

BRANCH CHECK DURING
CPU PROCESSING

APPARATUS AND METHOD FOR CONTROLLING ALLOCATION OF INSTRUCTIONS INTO AN INSTRUCTION CACHE STORAGE

This application is the U.S. national phase of International Application No. PCT/GB2019/050778 filed 20 Mar. 2019, which designated the U.S. and claims priority to GB Patent Application No. 1805922.0 filed 10 Apr. 2018, the entire contents of each of which are hereby incorporated by reference.

The present disclosure relates to a technique for controlling allocation of instructions into an instruction cache storage.

A data processing apparatus may support speculative execution of instructions, in which instructions are speculatively executed before it is known whether the instructions need in fact to be executed. For example, a processing apparatus may have a branch predictor for predicting outcomes of branch instructions so that subsequent instructions can be fetched, decoded and executed speculatively before it is known what the real outcome of the branch should be. If the prediction is correct then performance is saved because the subsequent instructions can be executed sooner than if they were only fetched once the outcome of the branch is actually known.

It has recently been identified that in certain instances allocation of instructions into a cache storage during speculative execution of instructions can open up a source of attack to seek to identify sensitive data. In particular, information has recently been published about speculation-based cache timing side-channel attacks, where a number of techniques can be used so that cache timing analysis can be abused to leak information out of mis-speculated execution of instructions.

In one example configuration, there is provided an apparatus comprising: processing circuitry to execute instructions; fetch circuitry to fetch instructions from memory for execution by the processing circuitry; an instruction cache storage to store instructions fetched from the memory by the fetch circuitry; and cache control circuitry responsive to the fetch circuitry fetching a target instruction from a memory address determined as a target address of an instruction flow changing instruction, at least when the memory address is within a specific address range, to prevent allocation of the fetched target instruction into the instruction cache storage unless the fetched target instruction is at least one specific type of instruction.

In another example configuration, there is provided a method of controlling allocation of instructions into an instruction cache storage used to store instructions fetched from memory for execution by processing circuitry, the method comprising: responsive to the fetching of a target instruction from a memory address determined as a target address of an instruction flow changing instruction, at least when the memory address is within a specific address range, preventing allocation of the fetched target instruction into the instruction cache storage unless the fetched target instruction is at least one specific type of instruction.

In a yet further example configuration, there is provided an apparatus comprising: processing means for executing instructions; fetch means for fetching instructions from memory for execution by the processing means; instruction cache storage means for storing instructions fetched from the memory by the fetch means; and cache control means, in response to the fetch means fetching a target instruction from a memory address determined as a target address of an instruction flow changing instruction, at least when the memory address is within a specific address range, for preventing allocation of the fetched target instruction into the instruction cache storage means unless the fetched target instruction is at least one specific type of instruction.

The present technique will be described further, by way of illustration only, with reference to examples thereof as illustrated in the accompanying drawings, in which:

FIG. 1 schematically illustrates a data processing apparatus in accordance with one example;

FIG. 2A schematically illustrates how, in accordance with one example implementation, a specific type of instruction can be used to indicate that a memory address determined as a target address of a branch instruction is a legitimate target address, whilst FIG. 2B illustrates how when the target address of a branch instruction identifies an instruction other than the specific type of instruction, this indicates that the target address is not a legitimate target address;

Figure 1:
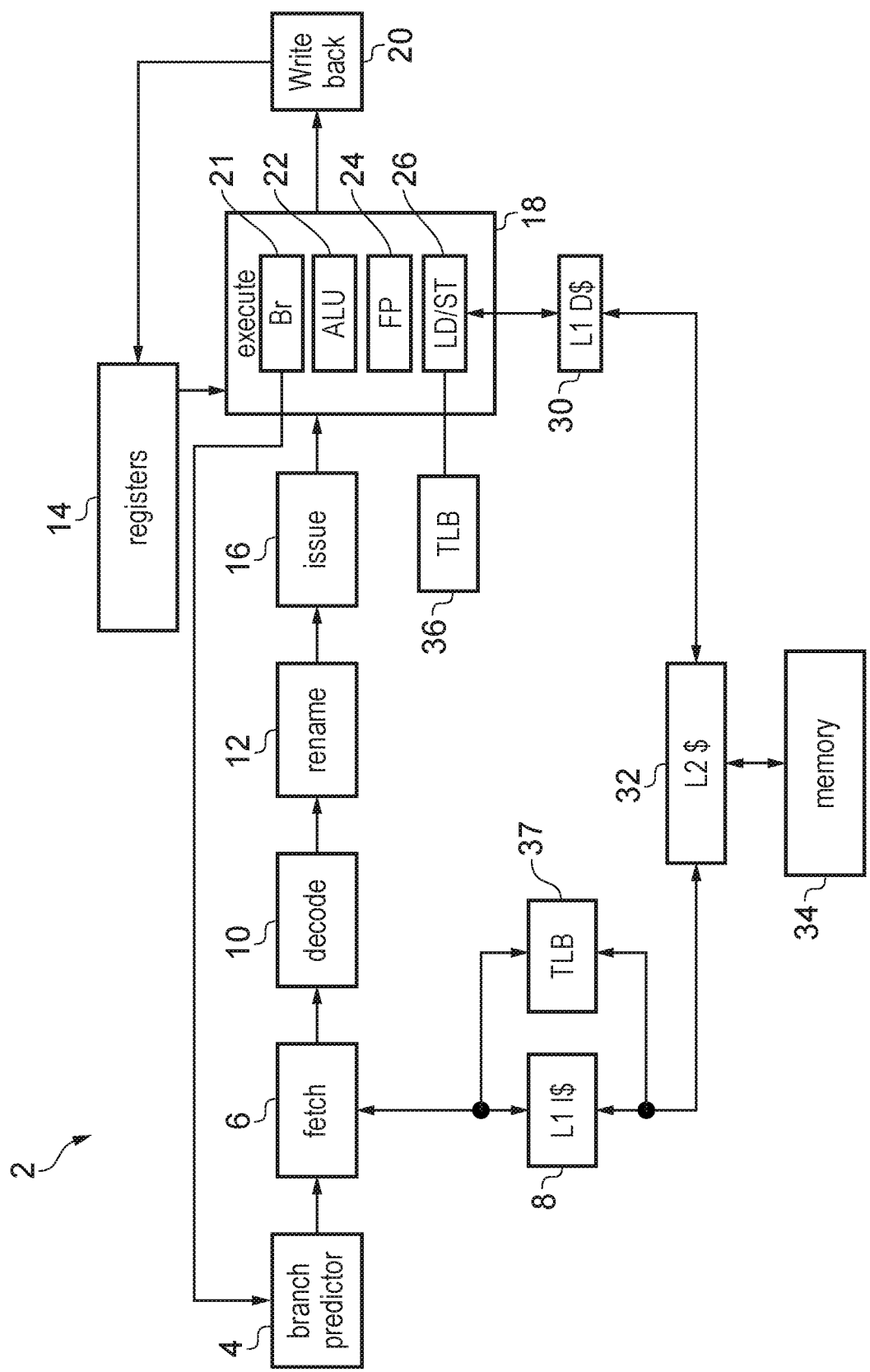

Information has recently been published information about speculation-based cache timing side-channel attacks, where a number of techniques can be used so that cache timing analysis can then be abused to leak information out of mis-speculated execution of instructions. The basic principle behind cache timing side-channels is that the pattern of allocations into a cache, and in particular which cache sets have been used for allocation, can be determined by measuring the time taken to access entries that were previously in that cache, or by measuring the time to access the entries that have been allocated. This can then be used to determine which addresses have been allocated into the cache. The novelty of speculation-based cache timing side-channels is their use of speculative memory reads. Speculative memory reads are typical of advanced microprocessors, and part of the overall functionality which enables high performance.

By performing a first speculative memory read to a cacheable location beyond an architecturally unresolved branch (or other change in program flow), the result of that read can itself be used to form the addresses of further speculative memory reads. These speculative reads cause allocations of entries into the cache whose addresses are indicative of the values of the first speculative read. This can become an exploitable side-channel if untrusted code is able to control the speculation in such a way that it causes a first speculative read of a location which would not otherwise be accessible by that untrusted code. In particular, the effects of the second and subsequent speculative allocations into the cache can be measured by the untrusted code.

Whilst the various speculative read operations referred to above might all be in relation to data values, and hence may cause data to be allocated into a data cache, it has been realised that there is the potential to employ a similar technique in connection with an instruction cache storage used to store instructions for execution by processing circuitry. For example, whilst the first speculative memory read referred to above may still be used to obtain a sensitive data value which is allocated into the data cache, that sensitive data could then be used to form an address of an instruction to be fetched, for example by being used in the determination of a target address for a branch instruction. Hence, in this scenario the further speculative memory reads are actually reads in respect of instructions found at target addresses that are derived from the sensitive data, with those instructions then being allocated into the instruction cache. In such a scenario, then the attacker may seek to perform a cache timing side-channel attack in respect of the instruction cache.

The techniques described herein are aimed at increasing the resilience of an instruction cache storage to such an attack.

In one example configuration, an apparatus is provided that has processing circuitry for executing instruction, fetch circuitry for fetching instructions from memory for execution by the processing circuitry, and an instruction cache storage for storing instructions fetched from the memory by the fetch circuitry. Assuming the fetched instructions are from an address region in memory that is considered to be cacheable, then typically those instructions would be cached within the instruction cache storage so as to improve access time to those instructions thereafter. However, at least when the memory address is within a specific address range, cache control circuitry provided in association with the instruction cache storage is arranged to be more selective about the instructions that are allocated into the instruction cache. In particular, in response to the fetch circuitry fetching a target instruction from a memory address determined as a target address of an instruction flow changing instruction, the cache control circuitry perform an additional check before allowing that target instruction to be cached. In particular, the cache control circuitry is arranged to prevent allocation of the fetched target instruction into the instruction cache storage unless the fetched target instruction is at least one specific type of instruction. Hence, only if the fetched target instruction conforms to one or more expected types is it allowed to be allocated into the instruction cache storage.

Due to the nature of the earlier-described attack, where addresses are derived from sensitive data, the attacker is unlikely to be able to cause target addresses to be generated that will identify instructions of a particular type, and hence it is highly likely when adopting the above approach that instructions fetched as a result of such an attack mechanism will not be allocated into the instruction cache, hence inhibiting the ability to perform a speculation-based cache timing side-channel attack in respect of the instruction cache.

Whilst the above described technique can be limited to certain situations, in particular to situations where the memory address is within a specific address range, in one implementation, irrespective of the memory address from which the target instruction is fetched, the cache control circuitry may be arranged to prevent allocation of the fetched target instruction into the instruction cache storage unless the fetched target instruction is the earlier-mentioned at least one specific type of instruction. This provides a particularly robust solution, since the same mechanism is applied irrespective of the memory address from which the target instruction is fetched.

In one example implementation, the processing circuitry is arranged to execute software that is configured to use said at least one specific type of instruction at each memory address that is a legitimate target address of an instruction flow changing instruction. Hence, in such implementations, the software will be arranged so that the various routines that can be branched to via an instruction flow changing instruction begin with an instruction of a particular type. This provides a mechanism for checking that the target address of an instruction flow changing instruction is a legitimate target address. It is highly likely that when the earlier-mentioned type of attack is instigated to seek to fetch instructions from addresses derived from the sensitive data, the instructions identified by the target addresses will not be the specific type of instruction, and hence will not be a legitimate target address of an instruction flow changing instruction.

Whilst this will later be detected by the mechanisms employed with the processing circuitry for managing speculative execution, and corrective action taken to restore the processing circuitry to a state prior to the speculative execution, without the above described technique those instructions might still get allocated into the instruction cache, and accordingly would still be present for any later instigated cache timing side-channel analysis. However, through use of the above described technique, such instructions will not get allocated into the instruction cache storage, and accordingly this will inhibit the ability for such a cache timing side-channel analysis to be performed.

The at least one specific type of instruction that is a legitimate target address of an instruction flow changing instruction can take a variety of forms. However, in one implementation the specific type of instruction comprises a dummy instruction whose purpose is to identify that the target address used by the instruction flow changing instruction to fetch that dummy instruction is a legitimate target address.

The processing circuitry can be arranged to react to such a dummy instruction in a variety of ways, but in one implementation the processing circuitry is arranged to process the dummy instruction by performing a no operation (no-op). Hence, the dummy instruction serves no useful processing purpose, but is merely there to identify that the target address of the instruction flow changing instruction was legitimate. In one particular implementation such a dummy instruction is referred to as a landing pad instruction, this being an instruction at which a branch is expected to land if the target address derived for the branch is legitimate.

From the above discussions, it will be appreciated that when the target address is derived from data obtained through mis-speculated execution of a load instruction, the cache control circuitry will prevent allocation of the fetched target instruction into the instruction cache whenever the fetched target instruction is other than said at least one specific type of instruction, thereby inhibiting performance of a cache timing side-channel attack being performed with respect to the instruction cache storage. The mis-speculated execution of a load instruction could for example be due to the earlier-mentioned performance of a first speculative memory read to a cacheable location beyond an architecturally unresolved branch (or other change in program flow). This could for example arise when untrusted software passes to trusted software a data value to be used as an offset into an array that will be accessed by the trusted software. The software code may include an instruction flow changing instruction in the form of a bounds check instruction, such that the read performed at an address derived from the data value passed by the untrusted software should only be performed if a bounds check operation is passed. However, due to speculation, the read operation may be performed before the outcome of the bounds check operation is known, and may cause the accessed data to be stored into a data cache.

In the context of the technique described herein in relation to the instruction cache, a situation of concern is where that data that should not have been accessed by the untrusted code is then used to generate target addresses for instruction flow changing instructions, and hence cause instructions to be fetched from those target addresses which are then allocated into the instruction cache. If such instructions are allocated into the instruction cache, then a timing analysis could later be performed in respect of instruction execution time to work out which cache lines have been evicted from the instruction cache as a result of the allocations made by the speculative execution, this enabling address information to be derived, which could then be used to seek to determine the sensitive data value obtained by the original speculative memory read operation.

However, it is highly unlikely that during that process, the target addresses generated from the sensitive data will identify instructions of the particular type mentioned earlier, and hence through use of the techniques described herein it is highly likely that those fetched instructions will not be allocated into the cache, thereby inhibiting performance of the cache timing side-channel attack.

It is also noted that when the target address is obtained from a misprediction by branch prediction circuitry, the cache control circuitry will prevent allocation of the fetched target instruction into the instruction cache whenever the fetched target instruction is other than said at least one specific type of instruction, thereby inhibiting performance of a cache timing side-channel attack being performed with respect to the instruction cache storage. In the event of misprediction, it is highly likely that the target address will not match with an address storing the at least one specific type of instruction, and hence allocation into the instruction cache storage will not occur. This is also very useful in inhibiting the ability to perform the earlier types of attack. In particular, another mechanism that can be used to seek to perform such an attack is referred to as a branch target injection variant of the attack. Such an attack makes use of the branch prediction circuitry, and in particular seeks to train a particular branch prediction mechanism using the untrusted code, so as to influence the branch predictions made by trusted code. In particular, a branch prediction mechanism may use the history of previous branches to speculate the change of an instruction stream. The resulting speculation can take a considerable time to be resolved. This delay in resolution can result in the process of performing speculative memory accesses, thus causing allocation into the caches.

In some implementations, the history of previous branches used to drive the speculation is not filtered by the exception level that the processor was in, and accordingly it is possible for the code running at one exception level to train the branch predictor in a manner that causes other exception levels (or other contexts) to perform speculative memory accesses. This can then be used to stimulate the speculation-based cache timing side-channel attack by having a lower exception level train the branch predictor to influence the speculative instruction stream of a higher exception level, or in a different context, to read data otherwise inaccessible at the lower exception level, and additionally to allocate items speculatively into the caches based on that data. Code running at the lower exception level can then examine the impact of cache allocation, so exploiting the cache timing side-channel.

Such a branch target injection variant of the attack could be used to seek to generate target addresses for branch instructions based on sensitive data so as to seek to cause allocations into the instruction cache. However, the above described mechanisms will tend to inhibit such an attack, since the instructions identified by target addresses generated in that manner are highly unlikely to be of the earlier mentioned specific type, and accordingly will not get allocated into the instruction cache.

The instruction flow changing instruction can take a variety of forms, and indeed can be any instruction that causes a change in instruction flow, i.e. a non-incremental adjustment in the instruction address used as the fetch address. However, in one example the instruction flow changing instruction is a branch instruction.

The instruction cache storage to which the above described techniques are applied can take a variety of forms. For example, it could be a dedicated cache storage used solely to cache instructions, such as a level one instruction cache. However, alternatively, or in addition, the techniques can be applied to other types of cache storage. For example, the instruction cache storage may be a cache storage used to store both instructions, and data values operated on by the processing circuitry when executing the instructions.

Particular examples will now be described with reference to the Figures.

FIG. 1 schematically illustrates an example of a data processing apparatus 2 having a processing pipeline comprising a number of pipeline stages. The pipeline includes a branch predictor 4 for predicting outcomes of branch instructions and generating a series of fetch addresses of instructions to be fetched. A fetch stage 6 fetches the instructions identified by the fetch addresses from an instruction cache 8. A decode stage 10 decodes the fetched instructions to generate control information for controlling the subsequent stages of the pipeline. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. The load/store unit 26 may use a translation lookaside buffer 36 and the fetch unit 6 may use a translation lookaside buffer 37 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

Such an apparatus as shown in FIG. 1 can be used to perform speculative execution of instructions. Speculative execution of instructions by the processing circuitry before it is actually known whether the inputs to those instructions are correct or whether those instructions needed to be executed at all, can be extremely beneficial in providing high processor performance. However, it has recently been recognised that if such speculation leads to memory accesses being performed speculatively, allocations into a cache triggered by the speculative memory accesses may remain visible even after a speculative instruction has been resolved as mispredicted or incorrectly speculated and the architectural effects of the speculative re-executed instructions have been reversed. This can then allow subsequently executed code to investigate what data was loaded by earlier code by using cache timing side-channels. The basic principle behind cache timing side-channels is that the pattern of allocations into a cache, and, in particular, which cache sets have been used for the allocation, can be determined by measuring the time taken to access entries that were previously in that cache, or by measuring the time to access the entries that have been allocated. This then can be used to determine which addresses have been allocated into that cache.

Speculation-based cache timing side-channels using speculative memory reads have recently been proposed. Speculative memory reads are typical of advanced microprocessors and part of the overall functionality which enables very high performance. By performing speculative memory reads to cacheable locations beyond an architecturally unresolved branch (or other change in program flow), and, further, using the result of those reads themselves to form the addresses of further speculative memory reads, these speculative reads cause allocations of entries into the cache whose addresses are indicative of the values of the first speculative read. This becomes an exploitable side-channel if untrusted code is able to control the speculation in such a way it causes a first speculative read of location which would not otherwise be accessible at that untrusted code, but the effects of the second speculative allocation within the caches can be measured by that untrusted code.

For any form of supervisory software, it is common for untrusted software to pass a data value to be used as an offset into an array or similar structure that will be accessed by the trusted software. For example, an application (untrusted) may ask for information about an open file, based on the file descriptor ID. Of course, the supervisory software will check that the offset is within a suitable range before its use, so the software for such a paradigm could be written in the form:

```
1    struct array {
2            unsigned long length;
3            unsigned char data[ ];
4    };
5    struct array *arr = ...;
6    unsigned long untrusted_offset_from_user = ...;
7    if (untrusted_offset_from_user < arr->length) {
8            unsigned char value;
9            value =arr->data[untrusted_offset_from_user];
10           ...
11   }
```

In a modern microprocessor, the processor implementation commonly might perform the data access (implied by line 9 in the code above) speculatively to establish value before executing the branch that is associated with the untrusted_offset_from_user range check (implied by line 7). A processor running this code at a supervisory level (such as an OS Kernel or Hypervisor) can speculatively load from anywhere in Normal memory accessible to that supervisory level, determined by an out-of-range value for the untrusted_offset_from_user passed by the untrusted software. This is not a problem architecturally, as if the speculation is incorrect, then the value loaded will be discarded by the hardware.

However, advanced processors can use the values that have been speculatively loaded for further speculation. It is this further speculation that is exploited by the speculation-based cache timing side-channels. For example, the previous example might be extended to be of the following form:

```
1    struct array {
2            unsigned long length;
3            unsigned char data[ ];
4    };
5    struct array *arr1 = ...; /* small array */
6    struct array *arr2 = ...; /*array of size 0x400 */
7    unsigned long untrusted_offset_from_user = ...;
8    if (untrusted_offset_from_user < arr1->length) {
9            unsigned char value;
10           value =arr1->data[untrusted_offset_from_user];
11           unsigned long index2 =((value&1) *0x100)+0x200;
12           if (index2 < arr2->length) {
13                   unsigned char value2 = arr2->data[index2];
14           }
15   }
```

In this example, "value", which is loaded from memory using an address calculated from arr1→data combined with the untrusted_offset_from_user (line 10), is then used as the basis of a further memory access (line13). Therefore, the speculative load of value2 comes from an address that is derived from the data speculatively loaded for value. If the speculative load of value2 by the processor causes an allocation into the cache, then part of the address of that load can be inferred using standard cache timing side-channels. Since that address depends on data in value, then part of the data of value can be inferred using the side-channel. By applying this approach to different bits of value, (in a number of speculative executions) the entirety of the data of value can be determined. Hence, the untrusted software can, by providing out-of-range quantities for untrusted_offset_from_user, access anywhere accessible to the supervisory software, and as such, this approach can be used by untrusted software to recover the value of any memory accessible by the supervisory software.

Modern processors have multiple different types of caching, including instruction caches, data caches and branch prediction cache. Where the allocation of entries in these caches is determined by the value of any part of some data that has been loaded based on untrusted input, then in principle this side channel could be stimulated. Whilst the example given above considered further speculation in the form of additional data load operations at addresses derived from the sensitive data ("value") obtained by the first speculative data load operation, the technique could also be applied where the further speculative memory accesses are fetch operations to fetch instructions from target addresses of branch operations, where the target addresses are derived with reference to the sensitive data loaded by the initial data load operation. An attacker might then initiate a cache timing analysis based on instruction execution time to seek to establish which cache lines have been evicted from the instruction cache by the speculative allocations, and hence obtain information about the addresses with the aim of deriving the sensitive data. The techniques described herein are aimed at making an instruction cache more robust to a cache timing analysis attack based on such activities.

Figure 2A:
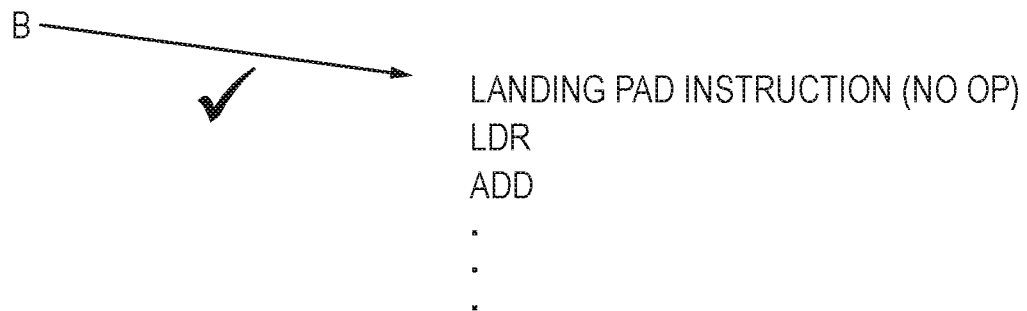
FIG. 2C is a flow diagram illustrating a branch check procedure implemented in one example implementation.
Figure 2B:
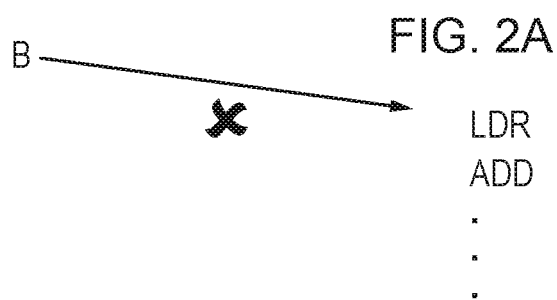

In accordance with the techniques described herein, the cache control circuitry associated with the level 1 instruction cache 8 is arranged to make use of a software mechanism used to identify legitimate target addresses of branch instructions, to selectively inhibit allocation of instructions into the instruction cache. In particular, in one example implementation, as illustrated in FIGS. 2A and 2B, the software may be written so that each software routine that is a legitimate target of a branch instruction starts with a specific type of instruction, in FIG. 2A this being referred to as a landing pad instruction. Hence, if the target address determined for a branch instruction is a memory address containing a landing pad instruction, then it will be determined that the target address is a valid target address. However, conversely, if the target address determined for a branch instruction is a memory address containing any other type of instruction, for example the load instruction in the example of FIG. 2B, then it will be determined that the target address is not a legitimate target address for the branch instruction.

Figure 2C:
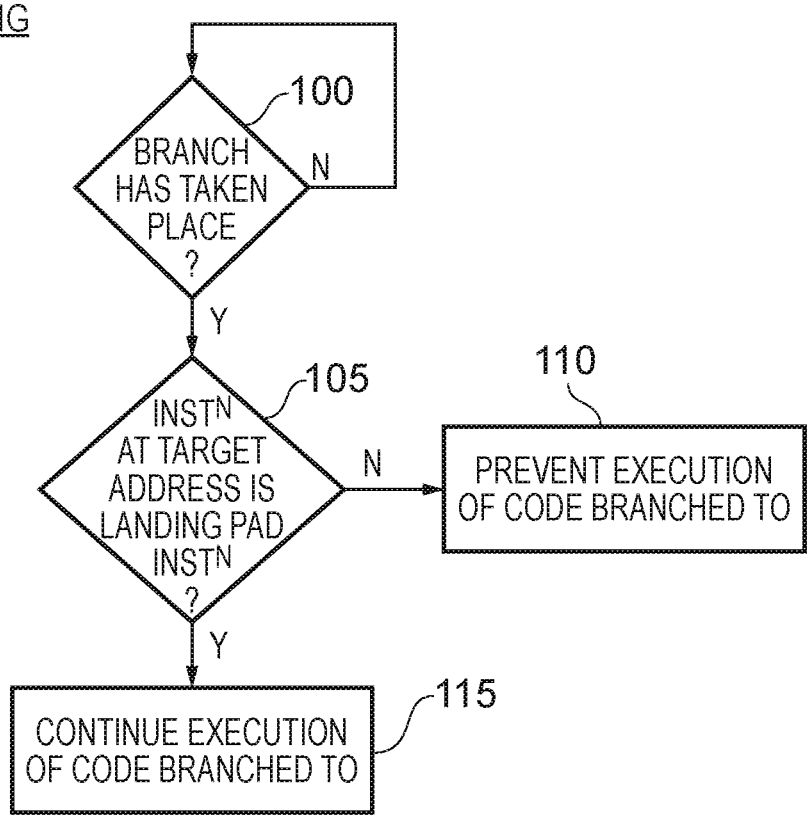

As illustrated in FIG. 2C, the processing circuitry can implement a branch checking operation to check the target address for branch instructions, so as to prevent execution of any code branched to by a branch instruction, where that code does not start with a landing pad instruction. In particular, as shown in FIG. 2C, the processing circuitry determines at step 100 whether a branch has taken place, and when it is determined that a branch has taken place (i.e. execution of an instruction flow changing instruction has caused a discontinuous change in the fetch address to a determined target address), then the process proceeds to step 105 where it is determined whether the instruction at the target address is a landing pad instruction. If it is not, then the process proceeds to step 110 where execution of the code branched to is prevented. This can be achieved in a variety of ways, but in one example implementation an exception is raised when the processing circuitry starts to execute the code at the target of the branch. Hence, considering the example of FIG. 2B, when the processing circuitry reaches the point where it is to start executing the load instruction, an exception will be taken and the code starting with the load instruction will not be executed.

However, if at step 105 it is determined that the instruction at the target address is the landing pad instruction, then at step 115 the processor will continue execution of the code that has been branched to.

The steps taken by the processor to process the landing pad instruction can vary dependent on implementation. However, in one particular implementation, the landing pad instruction is effectively a dummy instruction that performs no useful processing other than to identify that the target address is a legitimate target address for the branch. Hence, a no operation (no-op) will be performed by the processing circuitry on encountering the landing pad instruction, and processing will then continue with the next instruction in the sequence, in the example of FIG. 2A this being the load instruction. Whilst the above described use of the landing pad instruction can prevent execution of code at an unintended branch target, and hence for example address issues associated with execution of badly written code, or execution of code caused by an attacker seeking to branch to non-legitimate target addresses, due to speculative execution of code it is possible that instructions at the branch target address could be cached within the instruction cache. However, in accordance with the techniques described herein, the cache control circuitry associated with the level 1 instruction cache is able to selectively inhibit allocation of instructions into the instruction cache, and in particular will prevent allocation of instructions into the instruction cache when those instructions are fetched at a target address of a branch instruction, and are not of a specific instruction type (in the example of FIG. 2A, if they are not the landing pad instruction).

Figure 3:
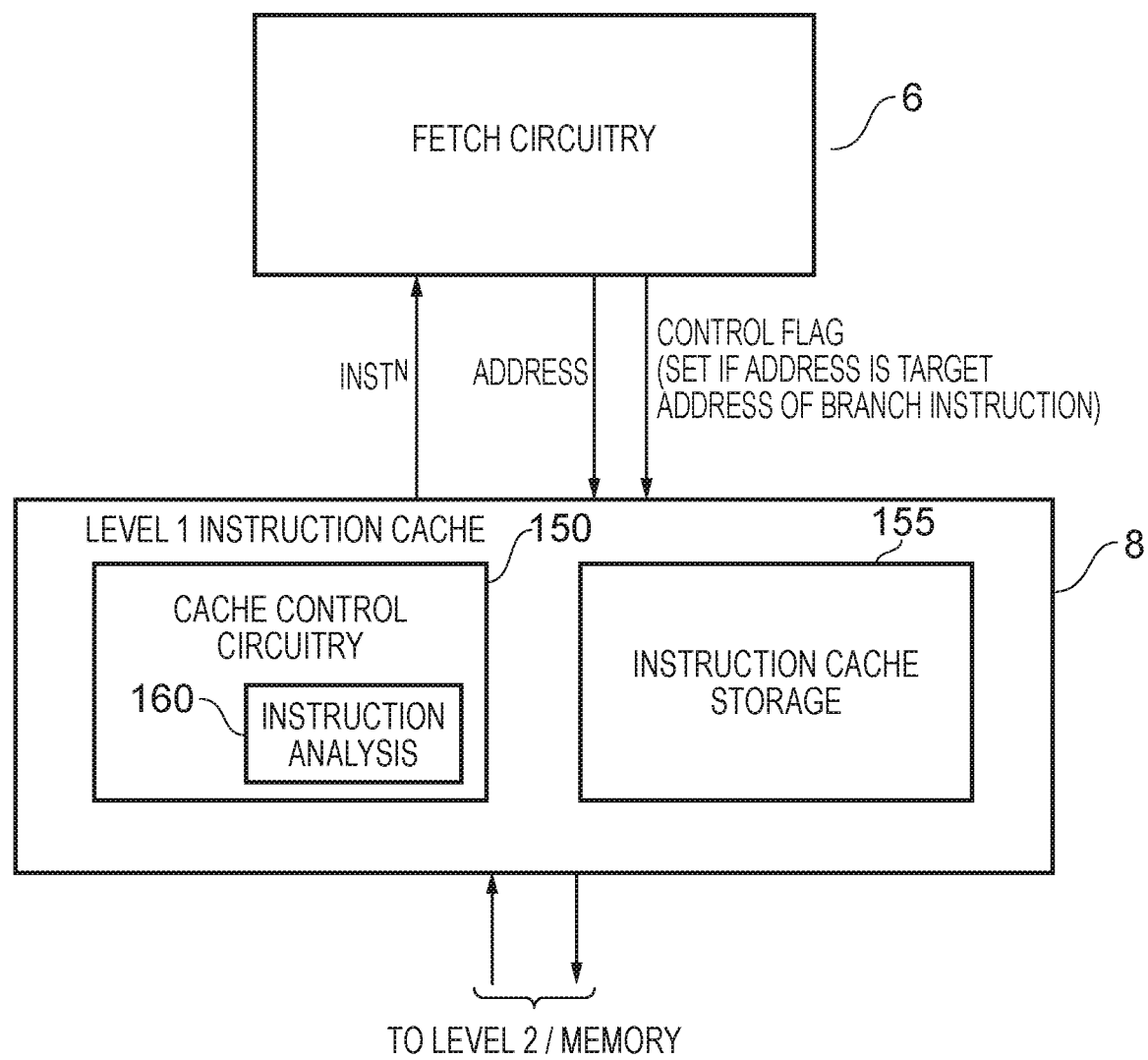
FIG. 3 illustrates in more detail components provided within the level one instruction cache of FIG. 1 in accordance with one example.

FIG. 3 illustrates in more detail components provided within the level 1 instruction cache 8 in accordance with one implementation. The instruction cache includes the usual instruction cache storage 155 for storing cache lines of instructions, and has cache control circuitry 150 for controlling allocation of instructions into the instruction cache 155, and for performing lookup operations within the instruction cache storage 155.

Hence, when the fetch circuitry 6 issues a fetch address to the level one instruction cache 8, the cache control circuitry 150 can perform a lookup within the instruction cache storage 155 in order to determine whether the required instruction is present within the cache. If so, the instruction can be returned directly to the fetch circuitry, whereas if not the cache control circuitry 150 will typically initiate transmission of a request to the level 2 cache 32 in order to seek to obtain the required instruction. Typically, a cache line's worth of instructions will be returned from the level 2 cache 32/memory 34, with that cache line then being allocated into the cache storage 155, in addition to the required instruction being returned to the fetch circuitry 6. However, as will be discussed with reference to the flow diagram of FIG. 4, this behaviour can be modified in certain situations, so as to selectively inhibit allocation of instructions into the instruction cache storage 155.

In particular, at step 200, a new fetch request is awaited from the fetch circuitry 6. Once the fetch request is received, then at step 205 the cache control circuitry performs a lookup in the cache storage 155. It is then determined at step 210 whether a hit has been detected, and if so the requested instruction is returned to the fetch circuitry 6 at step 215.

However, if a hit has not been detected, then the cache control circuitry 150 initiates retrieval of a cache line containing the instruction from the lower levels of cache/ main memory at step 220.

Once the cache line has been retrieved, then at step 225 the cache control circuitry 150 determines whether the fetch request indicates the address as a target address of a branch instruction. This can be indicated in a variety of ways, but in one example, as illustrated in FIG. 3, some form of control flag can be propagated from the fetch circuitry 6 to the instruction cache 8 along with the fetch address, to indicate situations where the fetch address is the target address of a branch instruction.

If the fetch request does not indicate that the address is the target address of a branch instruction, then the process merely proceeds to step 230 where the cache line is allocated into the instruction cache storage, and the requested instruction is returned to the fetch circuitry 6.

However, if the fetch request indicates that the address is a target address of a branch instruction, then the process proceeds to step 235 where a further check is performed before deciding whether the cache line should be allocated into the cache or not. In particular, it is determined whether the requested instruction at the target address specified by the fetch request is a landing pad instruction. To enable this determination to be made, the cache control circuitry 150 may include instruction analysis circuitry 160 shown in FIG. 3, to perform some preliminary decode in respect of the instruction in order to determine whether it is a landing pad instruction.

In some implementations, the presence of instruction analysis circuitry 160 within the cache control circuitry 150 of the level 1 instruction cache 8 may not be required, for example if such a preliminary decode is performed at a lower level of cache, and accordingly the information is available to the cache control circuitry 150 as part of the information retrieved from the lower level of cache.

If the retrieved instruction is a landing pad instruction, then this indicates that the fetch address is a legitimate target address for the branch instruction, and accordingly normal processing can be performed. As a result, the process proceeds to step 230 where the cache line is allocated into the instruction cache storage, and the requested instruction is returned to the fetch circuitry. However, if the retrieved instruction is not a landing pad instruction, then in the implementation shown in FIG. 4, the cache line of instructions is not allocated into the cache, so as not to displace any existing instruction cache contents, and instead the requested instruction is merely returned to the fetch circuitry 6 at step 240. As a result, whenever the retrieved instruction at a target address of a branch instruction is not the landing pad instruction, no allocation will be made into the instruction cache. Since it is highly likely that this will be the situation when the earlier-mentioned types of attack are performed, this ensures that none of the relevant instructions are allocated into the instruction cache, and hence can inhibit the performance of a later cache timing analysis by the attacker to seek to obtain information about the sensitive data.

In one implementation, at step 235, no allocation is made into the instruction cache whenever the retrieved instruction is not a landing pad instruction. However, if desired, the inhibiting of allocation in such a way can be restricted to particular memory address ranges, for example in situations where the cache line retrieved is in a page of memory with landing pads enabled. Hence, if the retrieved instruction is not a landing pad instruction, and is retrieved from a page of memory where landing pads are enabled, then no allocation will be made into the instruction cache, but otherwise an allocation may be made at step 230.

Figure 4:
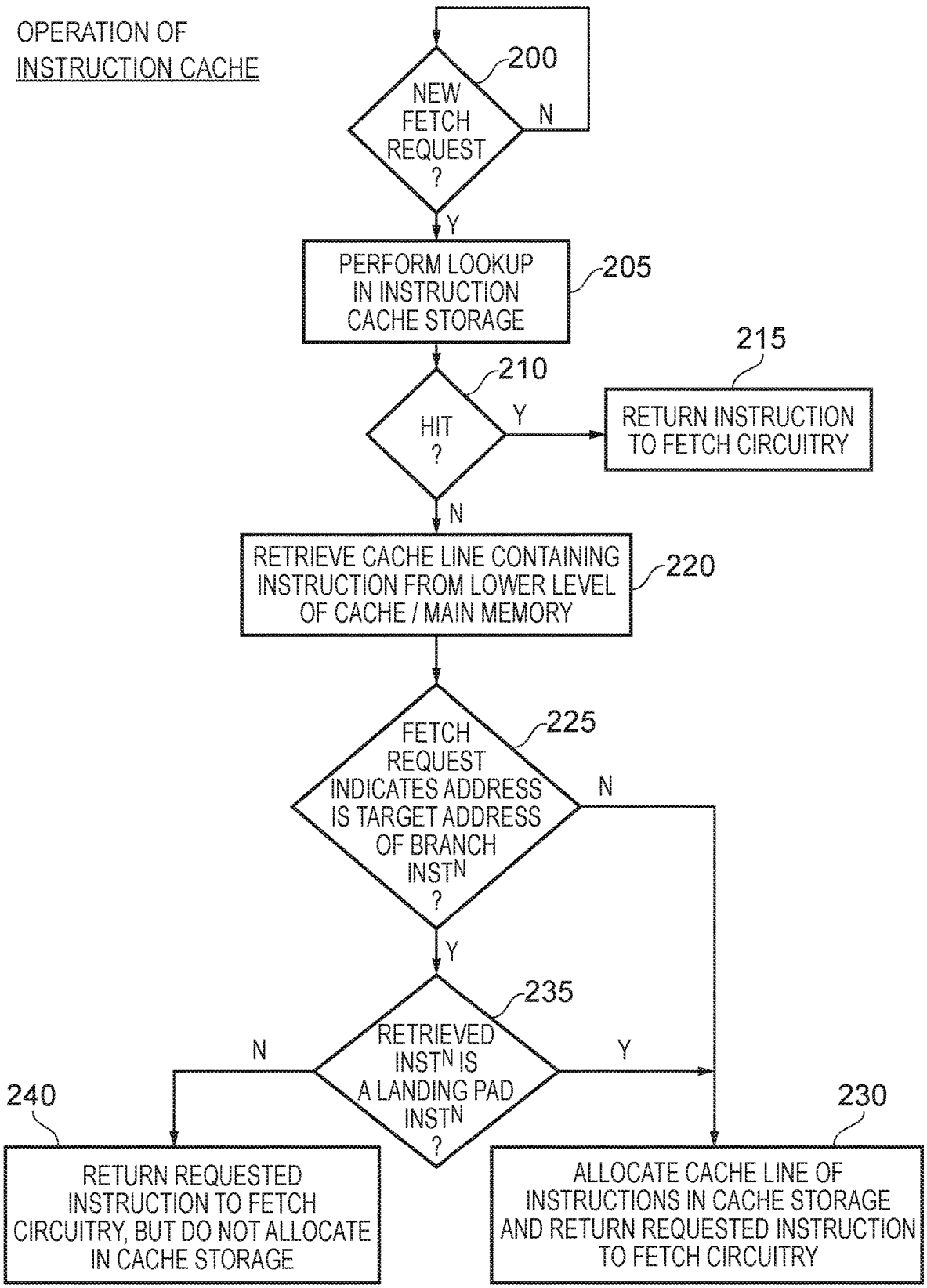
FIG. 4 is a flow diagram illustrating the operation of the instruction cache of FIG. 3 in one example implementation.

Whilst in the example of FIG. 4, if step 240 is reached no allocation is made, in alternative implementations a slightly different approach could be taken. For example, it could be decided to allocate the cache line but to mark it is as invalid. This could still be useful in situations where the attack scenario of concern is where an attacker is seeking to look at cache lines allocated rather than cache lines evicted.

Whilst the techniques discussed above have been described with reference to the level 1 instruction cache 8, the same techniques can in principle be applied at other levels in the memory hierarchy, for example at the shared instruction and data level 2 cache 32, so as to prevent allocation of instructions into the level 2 cache 32 when the situation discussed above in respect of the level 1 instruction cache 8 arises (i.e. where the fetched instruction at a target address of a branch is not a landing pad instruction).

By such an approach, allocation of instructions into the instruction cache can be prevented for a wide variety of mis-speculation situations, for example when there is mis-speculated execution of a load instruction, or some misprediction is performed by the branch prediction circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute instructions;
fetch circuitry to fetch instructions from memory for execution by the processing circuitry;
an instruction cache storage to store instructions fetched from the memory by the fetch circuitry; and
cache control circuitry responsive to the fetch circuitry fetching a target instruction from a memory address determined as a target address of an instruction flow changing instruction, at least when the memory address is within a specific address range, to prevent allocation of the fetched target instruction into the instruction cache storage unless the fetched target instruction is at least one specific type of instruction,
wherein the fetched target instruction is returned to the fetch circuitry for execution by the processing circuitry independent of whether the fetched target instruction is the at least one specific type of instruction.

2. An apparatus as claimed in claim 1, wherein, irrespective of the memory address from which the target instruction is fetched, the cache control circuitry is arranged to prevent allocation of the fetched target instruction into the instruction cache storage unless the fetched target instruction is said at least one specific type of instruction.

3. An apparatus as claimed in claim 1, wherein the processing circuitry is arranged to execute software that is configured to use said at least one specific type of instruction at each memory address that is a legitimate target address of an instruction flow changing instruction.

4. An apparatus as claimed in claim 1, wherein said at least one specific type of instruction comprises a dummy instruction whose purpose is to identify that the target address used by the instruction flow changing instruction to fetch that dummy instruction is a legitimate target address.

5. An apparatus as claimed in claim 4, wherein the processing circuitry is arranged to process the dummy instruction by performing a no operation (no-op).

6. An apparatus as claimed in claim 1, wherein when the target address is derived from data obtained through mis-speculated execution of a load instruction, the cache control circuitry will prevent allocation of the fetched target instruction into the instruction cache whenever the fetched target instruction is other than said at least one specific type of instruction, thereby inhibiting performance of a cache timing side-channel attack being performed with respect to the instruction cache storage.

7. An apparatus as claimed in claim 1, wherein when the target address is obtained from a misprediction by branch prediction circuitry, the cache control circuitry will prevent allocation of the fetched target instruction into the instruction cache whenever the fetched target instruction is other than said at least one specific type of instruction, thereby inhibiting performance of a cache timing side-channel attack being performed with respect to the instruction cache storage.

8. An apparatus as claimed in claim 7, wherein the misprediction is caused by a branch target injection attack.

9. An apparatus as claimed in claim 1, wherein said instruction flow changing instruction is a branch instruction.

10. An apparatus as claimed in claim 1, wherein the instruction cache storage is a cache storage used solely to cache instructions.

11. An apparatus as claimed in claim 1, wherein the instruction cache storage is a cache storage used to store both instructions, and data values operated on by the processing circuitry when executing the instructions.

12. A method of controlling allocation of instructions into an instruction cache storage used to store instructions fetched from memory for execution by processing circuitry, the method comprising:
responsive to the fetching of a target instruction from a memory address determined as a target address of an instruction flow changing instruction, at least when the memory address is within a specific address range, preventing allocation of the fetched target instruction into the instruction cache storage unless the fetched target instruction is at least one specific type of instruction,
wherein the fetched target instruction is returned for execution independent of whether the fetched target instruction is the at least one specific type of instruction.

13. An apparatus comprising:
processing means for executing instructions;
fetch means for fetching instructions from memory for execution by the processing means;
instruction cache storage means for storing instructions fetched from the memory by the fetch means; and
cache control means, in response to the fetch means fetching a target instruction from a memory address determined as a target address of an instruction flow changing instruction, at least when the memory address is within a specific address range, for preventing allocation of the fetched target instruction into the instruction cache storage means unless the fetched target instruction is at least one specific type of instruction,
wherein the fetched target instruction is returned to the fetch means for execution by the processing means independent of whether the fetched target instruction is the at least one specific type of instruction.

* * * * *